Patented Feb. 11, 1941

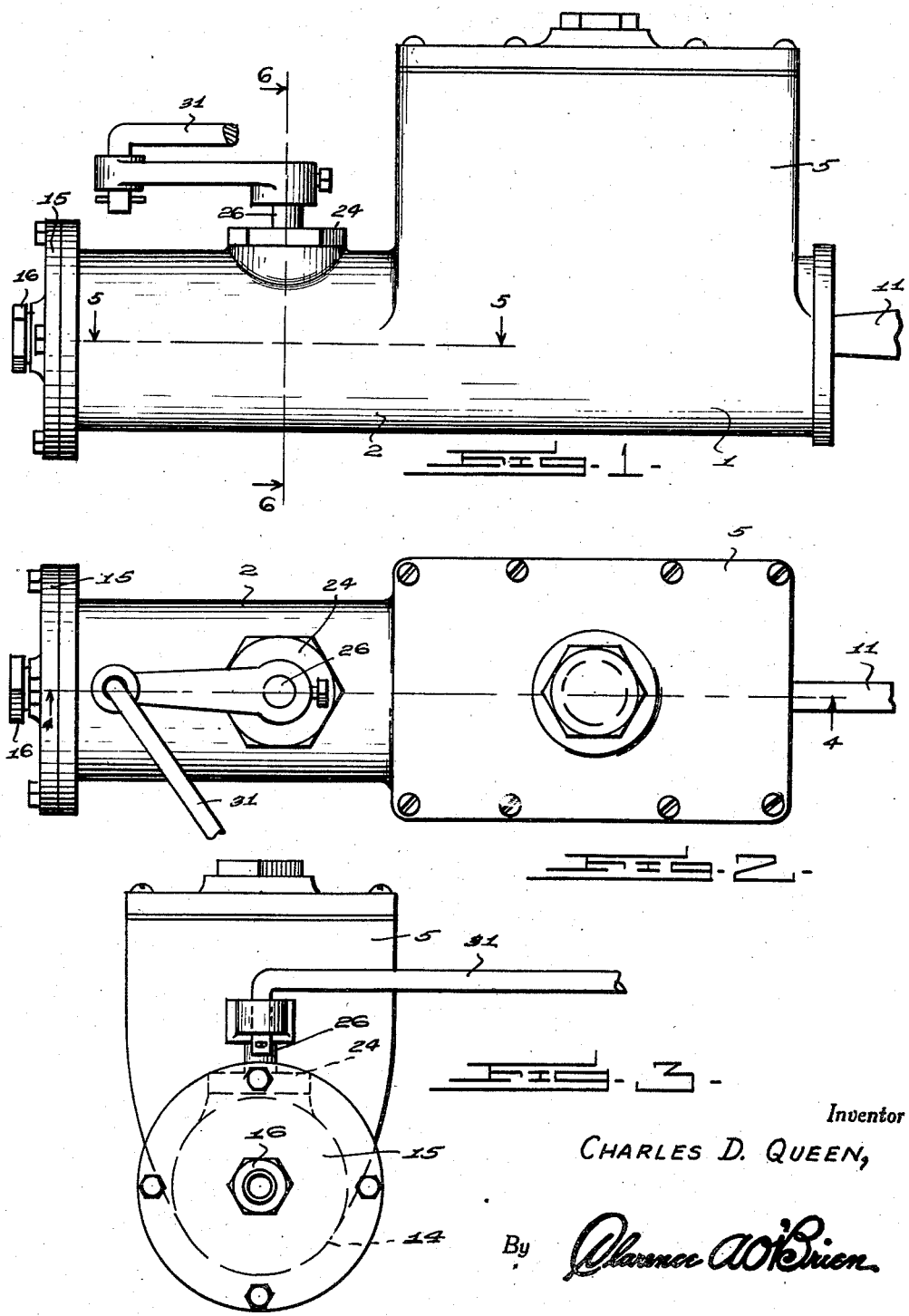

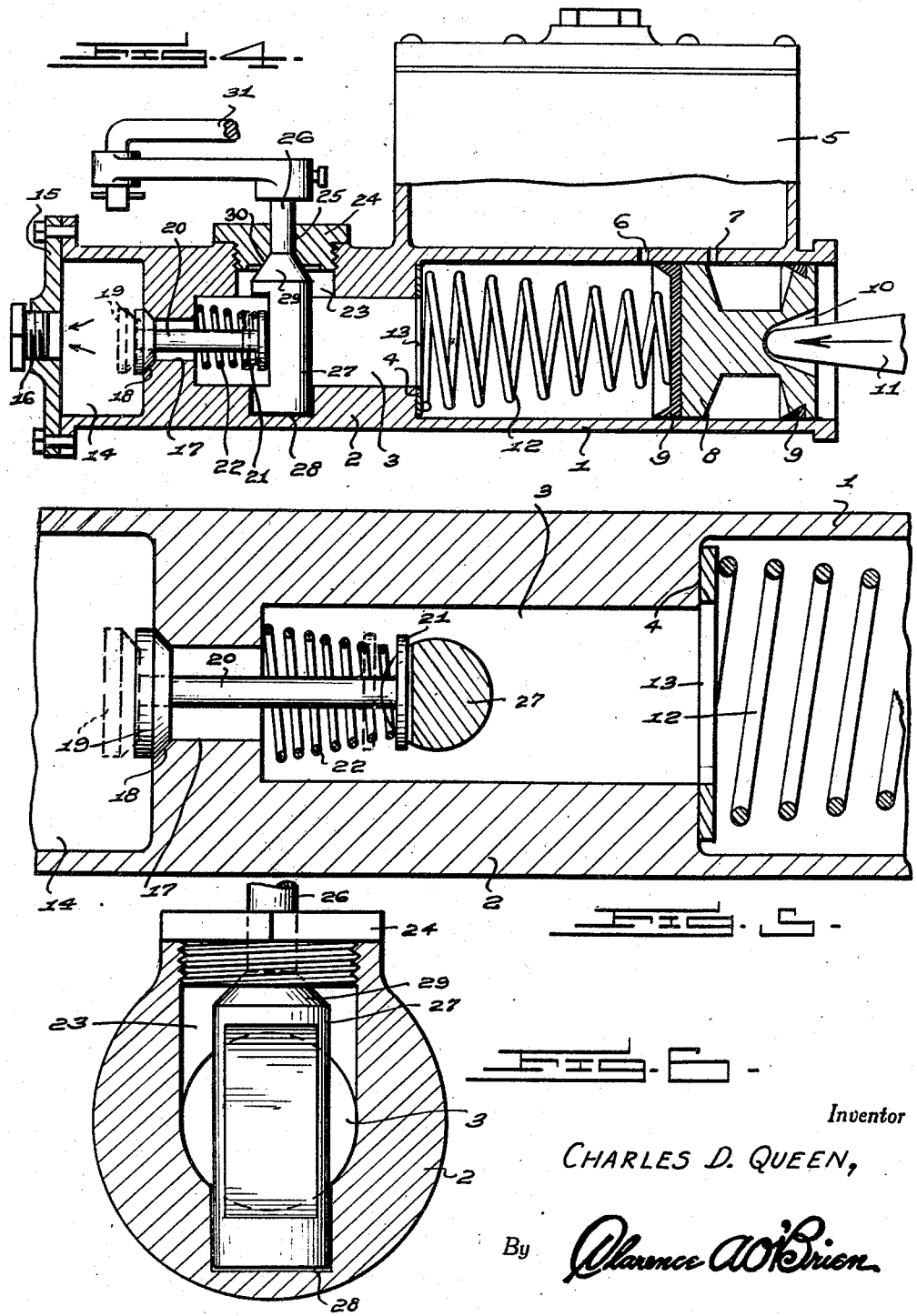

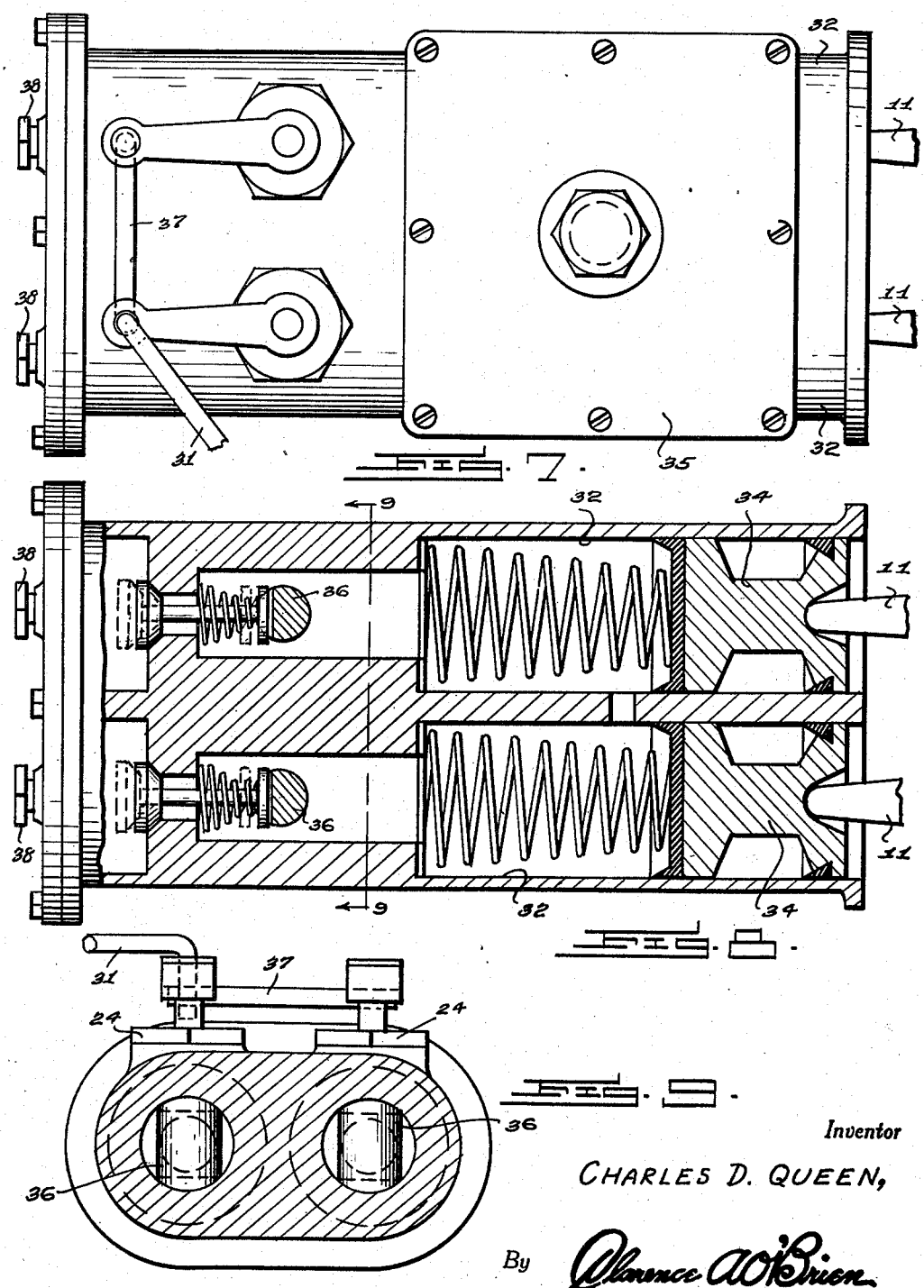

2,231,294

UNITED STATES PATENT OFFICE 2,231,294

HYDRAULIC BRAKE CONTROL

Charles D. Queen, Ashland, Ky.

Application February 26, 1940, Serial No. 320,877

1 Claim. (Cl. 188—152)

The present invention relates to new and useful improvements in hydraulic brake cylinders particularly for motor vehicles and has for its primary object to provide, in a manner as hereinafter set forth, a device of this character comprising novel means for releasably retaining the brakes of the vehicle in set or applied position when desired.

Other objects of the invention are to provide a hydraulic brake cylinder of the aforementioned character which will be comparatively simple in construction, strong, durable, highly efficient and reliable in use, compact and which may be manufactured and installed at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in side elevation of an embodiment of the device.

Figure 2 is a top plan view thereof.

Figure 3 is an end elevational view.

Figure 4 is a view principally in longitudinal section, taken substantially on the line 4—4 of Figure 2.

Figure 5 is an enlarged fragmentary view in horizontal section, taken substantially on the line 5—5 of Figure 1.

Figure 6 is a cross sectional view, taken substantially on the line 6—6 of Figure 1.

Figure 7 is a top plan view of another form of the invention.

Figure 8 is a view in horizontal section through the modification.

Figure 9 is a cross sectional view, taken substantially on the line 9—9 of Figure 8.

Referring now to the drawings in detail, it will be seen that the reference numeral 1 designates a horizontal cylinder having formed integrally with one end thereof what may be referred to as a head 2. The head 2 has formed therein a chamber 3 communicating with the cylinder 1, said chamber being reduced, thus providing a shoulder 4. The reference numeral 5 designates a fluid reservoir above the cylinder 1 and communicating therewith through longitudinally spaced ports 6 and 7.

Mounted for reciprocation in the cylinder 1 is a piston 8. The piston 8 is provided with cups 9 on its end portions. A socket 10 is provided in the outer end of the piston 8 for the reception of the usual push rod 11 which is actuated by the service brake pedal of the vehicle. A coil spring 12 is provided in the cylinder 1 for returning the piston 8 to inoperative position. It will be observed that one end of the coil spring 12 bears against the shoulder 4, a gasket 13 being interposed therebetween.

Formed in the free end portion of the head 2 is a chamber 14. A removable plate 15 closes the chamber 14. Connected to the plate 15 for receiving fluid from and returning said fluid to the chamber 14 is a line 16 to the brakes on the wheels of the vehicle.

The chamber 14 communicates with the chamber 3 through a passage 17. One end portion of the passage 17 is formed to provide a valve seat 18. The passage 17 is controlled by a spring closed check valve 19 of the poppet type. The valve 19 is mounted on one end of the stem 20 which extends through the passage 17 into the chamber 3 and has formed on its other end a head 21. A coil spring 22 is engaged with the head 21 in a manner to yieldingly urge the valve 19 toward closed position on the seat 18.

Formed in an upper portion of the head 2 is a threaded opening 23 having screwed thereinto a removable plug 24. Extending through the plug 24 is an opening 25 in which a shaft 26 is journaled. Fixed on the lower end of the shaft 26 for rotation in the head 2 is a vertical cam 27. The lower end portion of the cam 27 is journaled in a socket 28 which is provided therefor in the lower portion of the head 2. The upper portion of the cam 27 is formed to provide a substantially conical valve 29 which is engageable with a seat 30 which is provided therefor in the plug 24. Any suitable means, as at 31, may be provided for actuating the cam 27.

It is thought that the operation of the apparatus will be readily apparent from a consideration of the foregoing. The spring 22 normally keeps the check valve 19 in closed position on the seat 18. Of course, the brake system of the vehicle is supplied with fluid from the reservoir 5 which enters the cylinder 1 by gravity. When the piston 8 is actuated by the service brake pedal of the vehicle against the tension of the coil spring 12 fluid in the cylinder 1 is forced through the chamber 3 and the passage 17 into the chamber 14 from which said fluid goes to the brakes on the wheels on the vehicle. Of course, when the fluid is thus forced into the chamber 14 it opens the valve 19 against the tension of the coil spring 22. As soon as the pressure of the fluid in the chambers 3 and 14 equalizes the spring 22 closes the valve 19 thus retaining the brakes of the vehicle in applied or set position. Now, to release the brakes the cam 27 is rotated in a manner to open the valve 19 against the tension of the spring 22 thereby permitting the fluid to return through the passage 17 to the chamber 3 and the cylinder 1. It may be well to here state that the piston 8 does not move far enough on the brake applying stroke to expose or uncover the port 7.

The modification shown in Figures 7, 8 and 9 of the drawings is substantially similar to that illustrated in Figs. 1 to 6, inclusive, with the exception that it comprises a pair of parallel cylinders 32 communicating with each other, as at 33, at a point adjacent the forward ends of the pistons 34 when said pistons are in retracted or inoperative position. Each cylinder 32 communicates with a fluid reservoir 35. The cams 36 in this modified form of the invention are connected at 37 (see Fig. 7) for rotation in unison. Fluid lines are connected at 38 for receiving fluid from the cylinders 32. One of these fluid lines connects one of the cylinders 32 with the front brakes of the vehicle and the other of said fluid lines connects the other of said cylinders 32 with the rear brakes of the vehicle. Thus, the front brakes may continue to function should the rear brakes fail and vice versa. This of course, makes for added safety. In other respects the modification is substantially similar in construction and operation to the form of the invention shown in Figs. 1 to 5, inclusive, of the drawings.

It is believed that the many advantages of a hydraulic brake cylinder constructed in accordance with the present invention will be readily understood and although preferred embodiments of the device are as illustrated and described, it is to be understood that further modifications and changes in the details of construction may be resorted to which will fall within the scope of the invention as claimed.

What is claimed is:

A hydraulic brake control comprising a cylinder for the reception of a fluid, a longitudinally extending head integral with one end of said cylinder, said head having spaced chambers therein and further having a passage therein connecting said chambers, a valve operable in one of the chambers for controlling the passage, a stem on said valve extending into the other chamber, said other chamber communicating with the cylinder and having a radial socket therein at an intermediate point, a plug threadedly mounted in the head at a point diametrically opposite the socket, said plug having an opening therein and further including a substantially conical seat aligned with the opening, a cam rotatably mounted in said other chamber and operatively engageable with the stem for opening the valve, one end portion of the cam being journaled in the socket, a substantially conical valve on the other end of the cam engaged with the seat in the plug, a shaft projecting from the second named valve through the opening in the plug, and means on said shaft for rotating the cam.

CHARLES D. QUEEN.